United States Patent
Wada et al.

[11] Patent Number: 6,002,577
[45] Date of Patent: Dec. 14, 1999

[54] MONOLITHIC CERAMIC CAPACITOR

[75] Inventors: Hiroyuki Wada, Shiga-ken; Harunobu Sano, Kyoko, both of Japan

[73] Assignee: Murata Manufacturing Co., Ltd., Japan

[21] Appl. No.: 09/004,696

[22] Filed: Jan. 8, 1998

[30] Foreign Application Priority Data

Jan. 8, 1997 [JP] Japan ................................. 9-001229

[51] Int. Cl.$^6$ .............................. H01G 4/20; H01G 4/06
[52] U.S. Cl. ...................... 361/312; 361/321.5; 361/320; 361/321.4; 361/303; 361/305; 361/306.1; 361/306.3; 361/308.1; 361/309; 361/313; 361/321.1; 501/134; 501/137
[58] Field of Search ............................... 361/301.1, 301.4, 361/306.1, 306.3, 311, 312, 313, 320, 321.1–321.5, 322, 303–305, 309, 308.1; 501/134–139

[56] References Cited

U.S. PATENT DOCUMENTS

| | | | |
|---|---|---|---|
| 5,731,950 | 3/1998 | Sakamoto et al. | 361/321.4 |
| 5,815,368 | 9/1998 | Sakamoto et al. | 361/321.5 |
| 5,818,686 | 10/1998 | Mizuno et al. | 361/311 |
| 5,822,176 | 10/1998 | Sano et al. | 361/321.4 |
| 5,835,340 | 10/1998 | Wada et al. | 361/321.5 |
| 5,841,626 | 11/1998 | Sano et al. | 361/321.5 |
| 5,852,542 | 12/1998 | Wada et al. | 361/321.5 |
| 5,877,934 | 3/1999 | Sano et al. | 361/321.4 |

*Primary Examiner*—Kristine Kincaid
*Assistant Examiner*—Eric W. Thomas
*Attorney, Agent, or Firm*—Ostrolenk, Faber, Gerb & Soffen, LLP

[57] ABSTRACT

A monolithic ceramic capacitor has laminated plural dielectric ceramic layers, internal electrodes disposed between dielectric ceramic layers, and external electrodes formed at edge surfaces of the dielectric ceramic layers such that they are connected to alternate internal electrodes, wherein the dielectric ceramic layers are composed of a material comprising a principal component shown by the formula: $(1-\alpha-\beta-\gamma)\{BaO\}_m \cdot TiO_2 + \alpha M_2O_3 + \beta Re_2O_3 + \gamma(Mn_{1-x-y}Ni_xCo_y)O$ (wherein $M_2O_3$ is at least one kind of $Sc_2O_3$ and $Y_2O_3$; $Re_2O_3$ is at least one kind of $Sm_2O_3$ and $Eu_2O_3$; $0.0025 \leq \alpha+\beta \leq 0.025$, $0 < \beta \leq 0.0075$, $0.0025 \leq \gamma \leq 0.05$, $\gamma/(\alpha+\beta) \leq 4$, $0 \leq x < 1.0$, $0 \leq y < 1.0$, $0 \leq x+y \leq 1.0$, and $1.000 < m \leq 1,035$), and containing definite amounts of MgO and $SiO_2$ as side components.

25 Claims, 2 Drawing Sheets

MONOLITHIC CERAMIC CAPACITOR

FIELD OF THE INVENTION

The present invention relates to a ceramic capacitor used for electronic equipment, and more particularly to a monolithic ceramic capacitor having an internal electrode made of nickel or a nickel alloy.

BACKGROUND OF THE INVENTION

The production process for a monolithic ceramic capacitor is generally as follows. First, sheet-form dielectric ceramic materials having a surface which is coated with an electrode material which becomes an internal electrode, are prepared. As the dielectric ceramic material, for example, a material made up of $BaTiO_3$ as the principal component is used. Then, the sheet-form dielectric ceramic materials coated with the electrode material are laminated by pressing under heat and by calcining the integrated laminate at a temperature of from 1250 to 1350° C., whereby a dielectric ceramic having internal electrodes is obtained. Also, by baking external electrodes to connect to the internal electrodes at the edge surfaces, a monolithic ceramic capacitor is obtained.

Accordingly, the material of the internal electrode is required to meet to following conditions:

(a) Because the dielectric ceramic and the internal electrodes are simultaneously calcined, the material of the internal electrode has a melting point which is the same as or higher than the temperature at which the dielectric ceramic is calcined.

(b) The material is not oxidized even in an oxidative high-temperature atmosphere and does not react with the dielectric ceramic.

As the electrodes meeting such conditions, a noble metal or the alloy thereof, such as platinum, gold, palladium, a silver-palladium alloy and the like, has been used. However, although these electrode materials have excellent characteristics, they are expensive and are the largest factor increasing the production cost of monolithic ceramic capacitors.

Other high-melting materials include such base metals as Ni, Fe, Co, W, Mo and the like but these base metals are easily oxidized in a high-temperate oxidative atmosphere, whereby they become unusable as electrodes. Accordingly, to use these base metals as the internal electrodes of a monolithic ceramic capacitor, it is necessary to calcine the base metal together with a dielectric ceramic in a neutral or reducing atmosphere. However, conventional the materials are calcined in such a neutral or reducing atmosphere, they are greatly reduced and become semiconductor-like materials.

To overcome the fault described above, there are proposed, for example, a dielectric ceramic material wherein the barium site/titanium site ratio is in excess of the stoichiometric ratio in a barium titanate solid solution as shown in JP-B-57-42588 and a dielectric ceramic material made up of a barium titanate solid solution added with an oxide of a rare earth element such as La, Nd, Sm, Dy, Y, etc., as shown in JP-A-61-101459.

Also, as a dielectric ceramic material having a reduced temperature change of the dielectric constant, there are proposed, for example, a dielectric ceramic material of a $BaTiO_3$-$CaZrO_3$-$MnO$-$MgO$ series composition as shown in JP-A-62-256422 and a dielectric ceramic material of a $BaTiO_3$-$(Mg, Zn, Sr, Ca)O$-$B_2O_3$-$SiO_2$ series composition as shown in JP-B-61-14611.

By using such dielectric ceramic materials as described above, a dielectric ceramic which does not become a semiconductor-like material even when the material is calcined in a reducing atmosphere and the production of a monolithic ceramic capacitor using a base metal such as nickel and the like as the internal electrodes becomes possible.

With recent developments in electronics, the small-sizing of electronic parts has proceeded quickly and the tendency of both small-sizing and increasing the capacity of monolithic ceramic capacitors has also become remarkable. Thus, the increase of the dielectric constant of a dielectric ceramic material and thinning of a dielectric ceramic layer have dielectric ceramic material having a high dielectric constant, showing a small temperature change of the dielectric constant, and being excellent in the reliability has become large.

The dielectric ceramic materials shown in JP-B-57-42588 and JP-A-61-101459 give a large dielectric constant but have the faults that the crystal grains of the dielectric ceramic obtained are large so that when the thickness of the dielectric ceramic layer in the monolithic ceramic capacitor becomes as thin as 10 μm or thinner, the number of the crystal grains existing in each layer is reduced, and the reliability is lowered. Furthermore, there is also a problem in the dielectric ceramic materials that the temperature change of the dielectric constant is large. Thus, the above-described dielectric ceramic materials cannot meet the requirements of the market.

Also, the dielectric constant in the dielectric ceramic material shown in JP-A-62-256422 is relatively high, the crystal grains of the dielectric ceramic obtained are small, and the temperature change of the dielectric constant is small but because $CaZrO_3$ and also $CaTiO_3$ formed in the calcination process are liable to form a secondary phase with MnO, etc., there is a problem of reliability at high temperature.

Furthermore, there are faults in the dielectric ceramic material shown in JP-B-61-14611 in that the dielectric constant of the dielectric ceramic obtained is from 2,000 to 2,800 and that the material is disadvantageous from the view point of small-sizing and increasing the capacity of the monolithic ceramic capacitor. Also, there is a problem in that the dielectric ceramic material cannot satisfy the X7R is, the characteristic that the changing ratio of the electrostatic capacity is within ±15% in the temperature range of from −55° C. to +125° C.

Moreover, in the non-reducing dielectric ceramic disclosed in JP-A-63-103861, the insulating resistance and the temperature changing ratio of the capacity are largely influenced by the crystal size of $BaTiO_3$, which is the principal component, whereby control for obtaining stable characteristics is difficult. Also, when the insulating resistance is shown as the product with the electrostatic capacity (i.e., CR), that product is from 1,000 to 2,000 MW·μF and thus, it cannot be said that the non-reducing dielectric ceramic is commercially usable.

In the non-reducing dielectric ceramics proposed heretofore, various improvements have been made on the deterioration of the insulating resistance in a high-temperature loading life test but the deterioration of the insulating resistance in a wet loading test has not been so improved.

To solve the above-described problems, various components are proposed in JP-A-5-9066, JP-A-5-9067, and JP-A-5-9068. However, as a result of the requirement for further small-sizing and further increasing the capacity, the requirements of the market for thinning the thickness of the dielectric ceramic layer and more severe reliability requirement, the need for a dielectric ceramic material having even better reliability and ability to cope with thinning the layer thickness have increased. Accordingly, a necessary for providing a small-sized and large capacity monolithic ceramic capacitor excellent in the reliability characteristics under high temperature and high humidity has occurred.

When a dielectric ceramic layer is simply thinned at a definite rated voltage, the field strength per layer is increased. Accordingly, the insulating resistance at room temperature and high temperature is lowered and the reliability is greatly lowered. Thus, it is necessary to lower the rated voltage in the case of thinning the thickness of the dielectric ceramic layer in conventional dielectric ceramic.

Accordingly, the necessary of providing a monolithic ceramic capacitor which does not require lowering the rated voltage even when the thickness of the dielectric ceramic layer is thinned, has a high insulating resistance under a high field strength, and is excellent in the reliability, has occurred.

SUMMARY OF THE INVENTION

A primary object of the present invention is to provide a low-cost, small-sized, and large-capacity monolithic ceramic capacitor having excellent weather resistance performance such as high-temperature loading, wet loading, etc., wherein the dielectric constant is at least 3,000; when the insulating resistance is shown by the product with the electrostatic capacity (CR), the insulating resistances at 2 kV/mm and at room temperature and at 125° C. are at least 6,000 MΩ·μF and at least 2,000 MΩ·μF, respectively, and the insulating resistance at 20 kV/mm and at room temperature and at 125° C. are as high as at least 2,000 MΩ·μF and at least 500 MΩ·μF, respectively; and the temperature characteristics of the electrostatic capacity satisfy the B characteristics prescribed by the JIS standard and satisfy the X7R characteristics prescribed by the EIA standard.

It has now been discovered that the above-described object can be achieved by the present invention as described hereinbelow.

That is, a first aspect of the present invention is a monolithic ceramic capacitor comprising a pair of electrodes, dielectric layers disposed between said electrodes, the dielectric layer including barium titanate containing alkali metal oxides as impurities in amounts of not more than about 0.02% by weight, at least one kind of oxide selected from scandium oxide and yttrium oxide, at least one kind of oxide selected from samarium oxide and europium oxide, and at least one kind of oxide selected from manganese oxide, cobalt oxide and nickel oxide; and further containing magnesium oxide in an amount of from about 0.5 to 5.0 mols calculated as MgO and silicon oxide in an amount of from about 0.2 to 5.0 mols calculated as $SiO_2$ as side components per 100 mols of the principal component represented by the following component formula

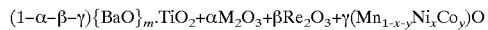

(1−α−β−γ){BaO}$_m$·TiO$_2$+αM$_2$O$_3$+βRe$_2$O$_3$+γ(Mn$_{1-x-y}$Ni$_x$Co$_y$)O (wherein $M_2O_3$ is at least one selected from $Sc_2O_3$ and $Y_2O_3$; $Re_2O_3$ is at least one selected from $Sm_2O_3$ and $Eu_2O_3$; and α, β, γ, m, x, and y are $0.0025 \leq \alpha+\beta \leq 0.025$, $0<\beta \leq 0.0075$, $0.0025 \leq \gamma \leq 0.05$, $\gamma/(\alpha+\beta) \leq 4$, $0 \leq x < 1.0$, $0 \leq y < 1.0$, $0 \leq x+y \leq 1.0$, and $1.000 < m \leq 1.035$), and the above-described internal electrodes are composed of nickel or a nickel alloy.

Preferably, M is Y, Re is Sm, $0.006 \leq \alpha+\beta \leq 0.02$, $0.0005 \leq \beta \leq 0.005$, $0.009 \leq \gamma \leq 0.04$, $\gamma/(\alpha+\beta) \leq 2$, $0.1 \leq x \leq 0.3$, $0.1 \leq y \leq 0.4$, $0.2 \leq x+y \leq 0.4$, and $1.005 \leq m \leq 1.015$), and the number of mols of MgO and $SiO_2$ per 100 mols are about 0.8–3 and about 1–2.5, respectively.

A second aspect of the present invention is a monolithic ceramic capacitor of the first aspect composed of a sintered layer of an electrically conductive metal powder or an electrically conductive metal powder combined with a glass frit.

A third aspect of the present invention is a monolithic ceramic capacitor of the first aspect wherein the above-described external electrodes are composed of a first layer made up of a sintered layer of an electrically conductive metal powder or an electrically conductive metal powder and glass frit and a second layer made up of a plating layer formed on the first layer.

DETAILED DESCRIPTION OF THE INVENTION

Figure 1:
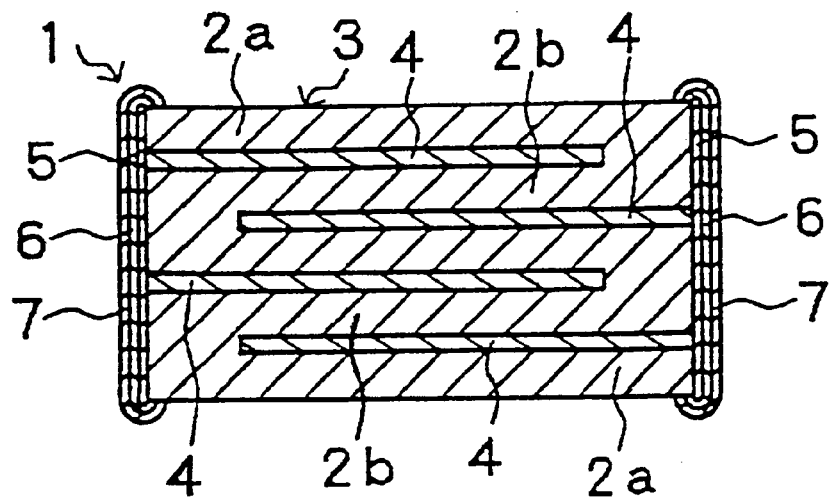
FIG. 1 is a schematic cross-sectional view showing an embodiment of the monolithic ceramic capacitor of the present invention.

In the present invention, by using a dielectric ceramic material comprising barium titanate, at least one oxide selected from scandium oxide and yttrium oxide; at least one oxide selected from samarium oxide and europium oxide; and at least one oxide selected from manganese oxide, cobalt oxide and nickel oxide, adjusted in the above-described component ratio and combined with magnesium oxide and silicon oxide as the material of the dielectric ceramic layer, a monolithic ceramic capacitor which can be calcined without deteriorating the characteristics thereof even when it is calcined in a reducing atmosphere, the temperature characteristics of the electrostatic capacity of which satisfy the B characteristics prescribed by the JIS standard and the X7R characteristics prescribed by the ETA standard, and which has a high insulating resistance at room temperature and high temperature under a high field strength and has a high reliability can be obtained.

Also, because the crystal grain sizes of the dielectric ceramic layers obtained are small as about 1 μm or smaller, the number of the crystal grains existing in a dielectric ceramic layer can be increased, whereby even when the thickness of each dielectric ceramic layer of the monolithic ceramic capacitor is thinned, the occurrence of lowering of the reliability can be prevented.

Also, it has been confirmed that in the principal components of the dielectric ceramic material of the dielectric ceramic layer composed of barium titanate, at least one oxide selected from scandium oxide and yttrium oxide, at least one oxide selected from samarium oxide and europium oxide, and at least one oxide selected from manganese oxide, cobalt oxide and nickel oxide, there slightly exist alkaline earth metal oxides such as SrO, CaO, etc., alkali metal oxides such as $Na_2O$, $K_2O$, etc., and other oxides such as $Al_2O_3$, $SiO_2$, etc., as impurities. Of these impurities, the content of particularly the alkali metal oxides such as $Na_2O$, $K_2O$, etc., has a large influence on the electric characteristics of the monolithic ceramic capacitor. That is, it has been confirmed that by using barium titanate wherein the impurities are less than about 0.02% by weight, a dielectric constant of 3,000 or higher is obtained.

Furthermore, it has been confirmed that by having silicon oxide in the dielectric ceramic layer, by controlling the calcining atmosphere to an oxygen partial pressure near the equilibrium oxygen partial pressure of Ni/NiO, the sintering property is improved and also the wet loading characteristics are improved.

When a dielectric ceramic layer is formed using the dielectric ceramic material as described above, a small-sized and large capacity monolithic ceramic capacitor showing less temperature change of electrostatic capacity and having a high reliability can be realized and also it becomes possible to use nickel or a nickel alloy or each metal combined with a small amount of a ceramic powder as the internal electrodes.

Also, there is no particular restriction on the composition of the external electrodes. For example, the external electrode may by composed of, for example, a sintered layer of each of various electrically conductive metal powders such as Ag, Pd, Ag-Pd, Cu, Cu alloys, etc., or a sintered layer of the above-described electrically conductive metal powder and each of various glass frits such as a $B_2O_3$-$Li_2O$-$SiO_2$-BaO series glass frit, a $B_2O_3$-$SiO_2$-BaO series glass frit, a $B_2O_3$-$SiO_2$-ZnO series glass frit, an $Li_2O$-$SiO_2$-BaO series glass frit, etc. Also, a small amount of a ceramic powder may be mixed together with the electrically conductive metal powder and the glass frit. More preferably, a plating layer is formed on the sintered layer and the plating layer may be a plating layer only made up of Ni, Cu, an Ni-Cu alloy, etc., or the plating may further have thereon a The present invention is described more practically based on the embodiment of the invention below but the invention is not limited to the embodiment.

Figure 2:
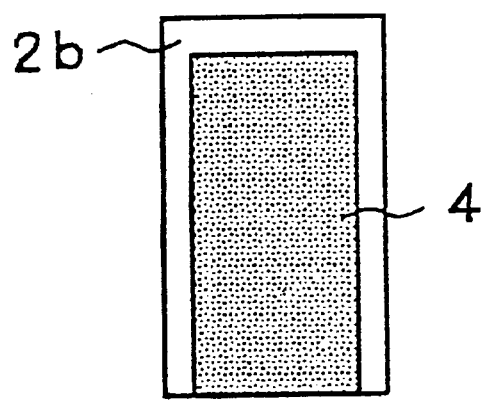
FIG. 2 is a schematic plane view showing a dielectric ceramic layer having an internal electrode as an embodiment of the present invention.
Figure 3:
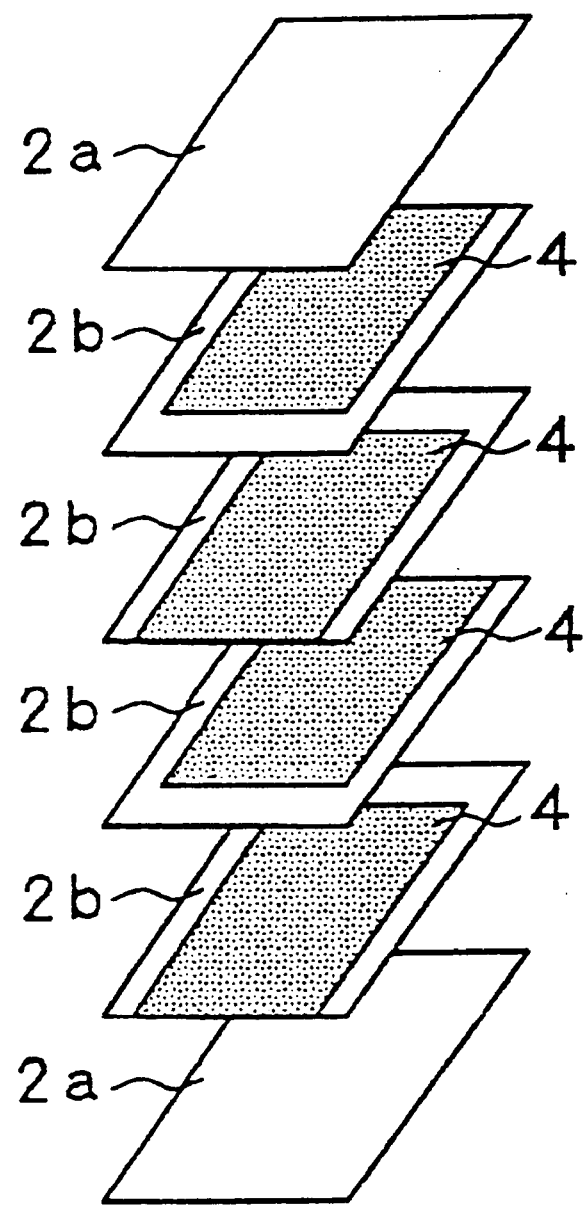
FIG. 3 is an exploded perspective view showing an embodiment of the ceramic laminate of the present invention.

An embodiment of the monolithic ceramic capacitor of the present invention will be explained. FIG. 1 is a schematic cross-sectional view showing an embodiment of the monolithic ceramic capacitor of the present invention, FIG. 2 is a schematic plane view showing a dielectric ceramic layer having an internal electrode as an embodiment of the present invention, and FIG. 3 is an exploded view of an embodiment of the ceramic laminate of the present invention.

As shown in FIG. 1, the monolithic ceramic capacitor 1 is a rectangular chip-type composed of a ceramic laminate 3 obtained by laminating plural dielectric ceramic layers 2a, 2b with internal electrodes 4 whose edge surfaces contact external electrodes 5, each of which has a first plating layer 6 of nickel, copper, etc., and a second plating layer 7 of a soft solder, tin, etc.

The production method of the monolithic ceramic capacitor 1 of the present invention as described above will be explained in the order of the production steps.

First, the ceramic laminate 3 is produced as follows. As shown in FIG. 2, using a slurry of the material powders comprising barium titanate; at least one oxide selected from scandium oxide and yttrium oxide; at least one oxide selected from samarium oxide and europium oxide; at least one oxide selected from manganese oxide, cobalt oxide and nickel oxide; magnesium oxide; and silicon oxide, a sheet-form dielectric ceramic layer 2 (green sheet) is ore pared and an internal electrode 4 made of nickel or a nickel alloy is formed on one surface of the layer 2. The internal electrode 4 may be formed by a screen printing method, a vapor deposition method, or a plating method.

Then, as shown in FIG. 3, a necessary number of the dielectric ceramic layers 2b each having the internal electrode 4 are laminated and sandwiched between dielectric ceramic layers 2a which have no internal electrode 4, followed by pressing to form a laminate. Thereafter, the laminated ceramic layers 2a, 2b . . . , 2b, 2a are calcined in a reducing atmosphere to form a ceramic laminate 3.

Then, two external electrodes 5 are formed at the edge surfaces of the ceramic laminate 3, respectively, so as to be connected to the internal electrodes 4.

As the material for the external electrodes 5, the same material as the internal electrodes 4 can be used. Also, silver, palladium, a silver-palladium alloy, copper, a copper alloy, etc., can be also used as the material for the external electrodes and further a material made up of the above-described metal powder with a glass frit such as a $B_2O_3$-$SiO_2$-BaO series glass or an $Li_2O$-$SiO_2$-BaO series glass may be also used as the material for the external electrodes. That is, a proper material is selected according to the intended use and environment of the monolithic ceramic capacitor.

The external electrodes 5 can be formed by coating an electrically conductive paste composed of the metal powder forming the external electrodes on both the edge surfaces of the ceramic laminate 3 another method, the electrically conductive paste is coated on both the edge surfaces of the ceramic laminate 3 before calcining and the external electrodes 5 are formed simultaneously with calcining the ceramic laminate 3. Thereafter, plating of nickel, copper, etc., is applied to each of the external electrodes 5 to form the first plating layer 6. Finally, the second plating layer 7 of a soft solder, tin, etc., is applied onto the first plating layer 6 to produce the chip-type monolithic ceramic capacitor 1.

The present invention is described in more detail by the following example below.

Example 1

First, after preparing and weighing $TiCl_4$ and $Ba(NO_3)_2$ of various purities as starting materials, they were precipitated with oxalic acid as barium titanyl oxalate ($BaTiO(C_2O_4)$ $.4H_2O$) to obtain precipitates. The precipitates were decomposed by heating to a temperature of 1,000° C. or higher to provide four kinds of barium titantes ($BaTiO_3$) shown in Table 1 below.

TABLE 1

| Kind of $BaTiO_3$ | Content of Impurities (wt/%) | | | | | Mean Grain size (μm) |
| --- | --- | --- | --- | --- | --- | --- |
| | Alkali metal oxide | SrO | CaO | $SiO_2$ | $Al_2O_3$ | |
| A | 0.003 | 0.012 | 0.001 | 0.010 | 0.005 | 0.60 |
| B | 0.020 | 0.010 | 0.003 | 0.019 | 0.008 | 0.56 |
| C | 0.012 | 0.179 | 0.018 | 0.155 | 0.071 | 0.72 |
| D | 0.062 | 0.014 | 0.001 | 0.019 | 0.004 | 0.58 |

Then, $BaCO_3$ for controlling the Ba/Ti mol ratio (m) of the barium titanate, $Sc_2O_3$, $Y_2O_3$, $Sm_2O_3$, $Eu_2O_3$, $MnCO_3$, NiO, $Co_2O_3$, and MgO each having a purity of 99% or higher, and a colloidal silica containing silicon oxide in an amount of 20% by weight (converted as $SiO_2$) were prepared. These raw material powders were compounded such that each of the component ratios shown in Table 2 below were realized to provide compounded products. In this Table, and Table 3 below, samples marked with an asterisk (*) are outside the scope of the invention.

TABLE 2

$(1 - \alpha - \beta - \gamma) \cdot (BaO)_m \cdot TiO_2 + \alpha M_2O_3 + \beta Re_2O_3 + \gamma(Mn_{1-x-y}Ni_xCo_y)O$

| Sample No. | Kind of BaTiO₃ | M Sc | M Y | α | Re Sm | Re Eu | β | α + β | β/α | γ | $\overline{\alpha+\beta}$ / γ | x | y | x + y | m | MgO mol | SiO₂ mol |
|---|---|---|---|---|---|---|---|---|---|---|---|---|---|---|---|---|---|
| 1* | A | — | — | — | — | — | — | — | — | 0.0200 | — | 0.10 | 0.30 | 0.40 | 1.015 | 1.50 | 1.00 |
| 2* | A | — | 0.0080 | 0.0080 | 0.0020 | — | 0.0020 | 0.0100 | 1/4 | — | — | — | — | — | 1.015 | 1.00 | 1.00 |
| 3* | A | — | 0.0100 | 0.0100 | — | — | — | 0.0100 | — | 0.0150 | 3/2 | 0.10 | 0.10 | 0.20 | 1.015 | 1.00 | 1.00 |
| 4* | A | — | 0.0100 | 0.0100 | 0.0020 | — | 0.0020 | 0.0120 | 1/5 | 0.0240 | 2 | 0.30 | 0.10 | 0.40 | 0.990 | 1.00 | 1.00 |
| 5* | A | — | 0.0060 | 0.0060 | — | 0.0020 | 0.0020 | 0.0080 | 1/3 | 0.0160 | 2 | 0.20 | 0.20 | 0.40 | 1.000 | 1.00 | 1.00 |
| 6* | A | — | 0.0075 | 0.0075 | 0.0025 | — | 0.0025 | 0.0100 | 1/3 | 0.0150 | 3/2 | 0.20 | 0.20 | 0.40 | 1.015 | 0.10 | 1.00 |
| 7* | A | — | 0.0080 | 0.0080 | 0.0010 | — | 0.0010 | 0.0090 | 1/8 | 0.0180 | 2 | 0.20 | 0.20 | 0.40 | 1.015 | 1.00 | — |
| 8 | A | — | 0.0020 | 0.0020 | — | 0.0005 | 0.0005 | 0.0025 | 1/4 | 0.0025 | 1 | 0.10 | 0.10 | 0.20 | 1.015 | 1.00 | 1.00 |
| 9 | A | — | 0.0200 | 0.0200 | — | 0.0050 | 0.0050 | 0.0250 | 1/4 | 0.0500 | 2 | 0.10 | 0.10 | 0.20 | 1.005 | 1.00 | 2.00 |
| 10 | A | 0.0005 | 0.0070 | 0.0070 | 0.0015 | 0.0015 | 0.0030 | 0.0100 | 3/7 | 0.0400 | 4 | 0.10 | 0.30 | 0.40 | 1.005 | 0.80 | 1.00 |
| 11 | B | — | 0.0125 | 0.0125 | 0.0075 | — | 0.0075 | 0.0200 | 3/5 | 0.0200 | 1 | — | 0.40 | 0.40 | 1.015 | 1.00 | 1.00 |
| 12 | C | — | 0.0050 | 0.0050 | 0.0025 | 0.0025 | 0.0050 | 0.0100 | 1 | 0.0100 | 1 | 0.20 | — | 0.20 | 1.015 | 1.00 | 1.00 |
| 13 | A | — | 0.0060 | 0.0060 | 0.0020 | — | 0.0020 | 0.0080 | 1/3 | 0.0160 | 2 | 0.30 | 0.10 | 0.40 | 1.035 | 0.80 | 2.00 |
| 14 | A | 0.0005 | 0.0045 | 0.0050 | — | 0.0030 | 0.0030 | 0.0080 | 3/5 | 0.0080 | 1 | — | — | — | 1.010 | 1.50 | 1.50 |
| 15 | A | — | 0.0100 | 0.0100 | 0.0050 | — | 0.0050 | 0.0150 | 1/2 | 0.0150 | 1 | 0.20 | 0.20 | 0.40 | 1.010 | 1.00 | 5.00 |
| 16 | A | — | 0.0080 | 0.0080 | 0.0020 | — | 0.0020 | 0.0100 | 1/4 | 0.0200 | 2 | 0.10 | 0.30 | 0.40 | 1.010 | 0.50 | 0.20 |
| 17 | A | — | 0.0050 | 0.0050 | 0.0010 | — | 0.0010 | 0.0060 | 1/5 | 0.0120 | 2 | 0.10 | 0.30 | 0.40 | 1.005 | 5.00 | 2.50 |
| 18 | A | — | 0.0050 | 0.0050 | 0.0050 | 0.0025 | 0.0075 | 0.0125 | 3/2 | 0.0150 | 6/5 | 0.30 | 0.10 | 0.40 | 1.005 | 0.50 | 2.00 |
| 19* | A | — | 0.0300 | 0.0300 | 0.0050 | — | 0.0050 | 0.0350 | 1/6 | 0.0350 | 1 | 0.20 | 0.20 | 0.40 | 1.005 | 0.50 | 1.50 |
| 20* | A | — | 0.0200 | 0.0200 | 0.0020 | — | 0.0020 | 0.0220 | 1/10 | 0.0660 | 3 | 0.20 | 0.30 | 0.50 | 1.010 | 0.80 | 1.00 |
| 21* | A | — | 0.0060 | 0.0060 | 0.0030 | — | 0.0030 | 0.0090 | 1/2 | 0.0450 | 5 | 0.10 | 0.30 | 0.40 | 1.015 | 1.00 | 1.00 |
| 22* | A | — | 0.0020 | 0.0020 | — | 0.0100 | 0.0100 | 0.0120 | 5 | 0.0180 | 3/2 | 0.10 | 0.10 | 0.20 | 1.010 | 1.00 | 1.00 |
| 23* | A | — | 0.0080 | 0.0080 | 0.0020 | — | 0.0020 | 0.0100 | 1/4 | 0.0100 | 1 | 1.00 | — | 1.00 | 1.010 | 1.50 | 1.00 |
| 24* | A | — | 0.0050 | 0.0050 | 0.0010 | — | 0.0010 | 0.0060 | 1/5 | 0.0120 | 2 | — | 1.00 | 1.00 | 1.010 | 1.00 | 0.80 |
| 25* | A | — | 0.0060 | 0.0060 | — | 0.0020 | 0.0020 | 0.0080 | 1/3 | 0.0120 | 3/2 | 0.50 | 0.50 | 1.00 | 1.010 | 1.50 | 0.80 |
| 26* | A | — | 0.0075 | 0.0075 | 0.0025 | — | 0.0025 | 0.0100 | 1/3 | 0.0100 | 1 | 0.10 | 0.10 | 0.20 | 1.050 | 0.50 | 1.50 |
| 27* | A | — | 0.0050 | 0.0050 | 0.0010 | — | 0.0010 | 0.0060 | 1/5 | 0.0120 | 2 | 0.10 | 0.10 | 0.20 | 1.005 | 7.00 | 1.50 |
| 28* | A | — | 0.0080 | 0.0080 | — | 0.0020 | 0.0020 | 0.0100 | 1/4 | 0.0100 | 1 | 0.10 | 0.10 | 0.20 | 1.015 | 1.00 | 7.00 |
| 29* | D | — | 0.0080 | 0.0080 | 0.0010 | 0.0010 | 0.0020 | 0.0100 | 1/4 | 0.0150 | 3/2 | 0.10 | 0.10 | 0.20 | 1.015 | 1.00 | 1.00 |

To each of the compounded products thus obtained were added a polyvinyl butyral series binder and an organic solvent such as ethanol, etc., and the mixture was wet blended in a ball mill to prepare a ceramic slurry. Thereafter, the ceramic slurry was formed into a sheet by the doctor blade method to provide a rectangular green sheet having a thickness of 11 μm. Then, an electrically conductive paste containing Ni as the principal component was printed on the above-described ceramic green sheet to form an electrically conductive layer for constituting an internal electrode.

Plural ceramic green sheets each having formed thereon the electrically conductive paste layer, one side of which protruded to one side of the sheet, were prepared. These plural ceramic green sheets were laminated such that the protruded sides of the electrically conductive paste layers alternated. After burning the binder by heating the laminate obtained to a temperature of 350° C. in a nitrogen gas atmosphere of an $H_2$-$N_2$-$H_2O$ gas of an oxygen partial pressure of from $10^{-9}$ to $10^{-12}$ MPa for 2 hours at the temperature shown in Table 3 below to provide a ceramic sintered material.

The surface of the ceramic sintered material obtained was observed by a scanning electron microscope at a magnification of 1,500 and grain sizes were measured.

After calcining, a silver paste containing a $B_2O_3$-$Li_2O$-$SiO_2$-BaO series glass frit was coated on both the edge surfaces of the sintered material obtained and baked in a nitrogen gas atmosphere at a temperature of 600° C. to form external electrodes electrically connected to the internal electrodes.

The external size of the monolithic ceramic capacitor obtained as described above was a width of 1.6 mm, a length of 3.2 mm and a thickness of 1.2 mm. Also, the thickness of the dielectric ceramic layer disposed between the internal electrodes was 8 μm.

The total number of the effective dielectric ceramic layers was 19 and the area of the counter electrode per layer was 2.1 mm².

The electric characteristics of these monolithic ceramic capacitors obtained were measured. The electrostatic capacity (C) and the dielectric loss (tan δ) were measured using an automatic bridge-type measuring apparatus at a frequency of 1 kHz, 1 Vrms and a temperature of 25° C., and also the dielectric constant (ε) was calculated from the electrostatic capacity.

Then, the insulating resistances (R) at 25° C. and 125° C. were measured using an insulating resistance meter by applying a direct current voltage of 16 V for 2 minutes, and the product of the electrostatic capacity (C) and the insulating resistances (R), that is, the product CR were obtained.

To measure the insulating resistance (R) at an electric field of 20 kV/mm, the insulating resistances (R) at 25° C. and 125° C. were similarly measured by applying a direct current voltage of 160 V for 2 minutes and the CR products were obtained.

Furthermore, the changing ratio of the electrostatic capacity as a function of temperature change was measured.

In addition, the changing ratio of the electrostatic capacity to a temperature change, the changing ratios at −25° C. and 85° C. with the electrostatic capacity at 20° C. as the standard (ΔC/C20° C.), the changing ratios at −55° C. and 125° C. with the electrostatic capacity at 25° C. as the standard (ΔC/C25° C.), and the maximum absolute value of the changing ratio within the range of from −55° C. to 125° C. (|ΔC/C25° C. |max) were determined.

In a high-temperature loading life test, 36 samples were prepared in each case and the change of the insulating resistance of each of the samples was measured at a temperature of 150° C. by applying a direct current voltage of 100 V. In addition, the time at which the insulating resistance value (R) of each sample became $10^6 \Omega$ or lower was defined as the life time and the average life time of the life times of all the samples was determined.

In the wet loading test, 72 samples were prepared in each case and when a direct current voltage of 16 V was applied to these samples at 2 atms (relative humidity 100%) and at a temperature of 121° C., the number of the samples the insulating resistance values (R) of which became $10^6 \Omega$ or lower before 250 hours was noted. shown in Table 3 below.

out at a relatively low temperature. Also, the grain sizes are small as about 1 $\mu$m or less.

The reasons for limiting the composition of the dielectric ceramic materials used for the monolithic ceramic capacitors of the present invention are explained below.

In $(1-\alpha-\beta-\gamma)\{BaO\}_m \cdot TiO_2 + \alpha M_2O_3 + \beta Re_2O_3 + \gamma(Mn_{1-x-y}Ni_xCo_y)$ O (wherein $M_2O_3$ is at least one selected from $Sc_2O_3$ and $Y_2O_3$; $Re_2O_3$ is at least one selected from $Sm_2O_3$ and $Eu_2O_3$), $\alpha$, $\beta$, $\gamma$, m, x, and y are defined as described above in the present invention and this is because:

When the amount $(\alpha+\beta)$ of $(M_2O_3+Re_2O_3)$ is less than about 0.0025 as in Sample No. 1, the dielectric constant is lower than 3,000, the temperature changing ratio of the electrostatic capacity becomes large, the insulating resis-

TABLE 3

| Sample No. | Calcining Temperature °C. | Dielectric Constant | Dielectric Loss tan δ % | Capacity Temperature Changing Ratio % | | | | | CR Product MΩ · μF | | | | Average Life Time hr | Wet Loading Test | Grain Size μm |
|---|---|---|---|---|---|---|---|---|---|---|---|---|---|---|---|
| | | | | ΔC/C20° C. | | ΔC/C25° C. | | | 25° C. | | 125° C. | | | | |
| | | | | −25° C. | 85° C. | −55° C. | 125° C. | max | 16V | 160V | 16V | 160V | | | |
| 1* | 1280 | 2800 | 2.3 | −4.5 | 17.0 | −11.3 | 12.0 | 19.8 | 8240 | 6790 | 2820 | 390 | 8 | 0/72 | 0.87 |
| 2* | 1300 | | | Impossible for measurement because of becoming semiconductor | | | | | | | | | | | 2.6 |
| 3* | 1300 | 3400 | 2.2 | −1.9 | −5.9 | −2.2 | −6.8 | 6.8 | 6480 | 2410 | 2490 | 550 | 418 | 0/72 | 0.72 |
| 4* | 1280 | | | Impossible for measurement because of becoming semiconductor | | | | | | | | | | | 1.9 |
| 5* | 1280 | 3310 | 2.3 | −2.9 | −5.5 | −3.2 | −5.6 | 5.6 | 3820 | 1680 | 1470 | 390 | 248 | 0/72 | 0.72 |
| 6* | 1280 | 3450 | 2.4 | 0.6 | −9.6 | 0.8 | −18.1 | 18.1 | 5720 | 1920 | 1780 | 400 | 463 | 0/72 | 0.74 |
| 7* | 1360 | | | Impossible for measurement because of insufficient sintering | | | | | | | | | | | 0.62 |
| 8 | 1280 | 4150 | 2.4 | −9.3 | −6.8 | −12.8 | −13.2 | 13.2 | 7260 | 4580 | 3080 | 720 | 521 | 0/72 | 0.73 |
| 9 | 1280 | 3050 | 1.6 | −1.7 | −5.3 | −1.9 | −5.6 | 5.6 | 6120 | 2110 | 2210 | 530 | 698 | 0/72 | 0.68 |
| 10 | 1300 | 3380 | 2.0 | −1.9 | −5.9 | −2.0 | −6.9 | 6.9 | 6320 | 2520 | 2680 | 660 | 573 | 0/72 | 0.68 |
| 11 | 1300 | 3030 | 1.3 | 1.8 | 4.6 | 1.8 | 5.0 | 5.0 | 6430 | 2380 | 2370 | 560 | 612 | 0/72 | 0.62 |
| 12 | 1300 | 3330 | 1.9 | 0.6 | −8.6 | 1.0 | −13.7 | −13.7 | 6220 | 2690 | 2710 | 680 | 542 | 0/72 | 0.78 |
| 13 | 1300 | 3390 | 1.9 | −0.8 | −9.0 | −1.1 | −12.0 | −12.0 | 6670 | 3320 | 3080 | 739 | 510 | 0/72 | 0.69 |
| 14 | 1300 | 3630 | 2.3 | −1.0 | −8.0 | −1.1 | −10.4 | −10.4 | 6830 | 2760 | 2710 | 630 | 576 | 0/72 | 0.74 |
| 15 | 1260 | 3090 | 1.6 | −2.6 | −5.1 | −2.7 | −5.3 | −5.3 | 6190 | 2070 | 2110 | 550 | 543 | 0/72 | 0.67 |
| 16 | 1300 | 3380 | 2.1 | −1.8 | −6.1 | −2.0 | −7.0 | −7.0 | 6590 | 2480 | 2510 | 720 | 588 | 0/72 | 0.70 |
| 17 | 1300 | 3420 | 2.3 | −1.1 | −9.0 | −1.6 | −11.9 | −11.9 | 6650 | 2060 | 2110 | 540 | 512 | 0/72 | 0.72 |
| 18 | 1300 | 3300 | 1.8 | −2.4 | −9.7 | −3.0 | −14.8 | −14.8 | 6410 | 2070 | 2090 | 510 | 536 | 0/72 | 0.72 |
| 19* | 1360 | 2100 | 1.3 | −2.1 | −1.0 | −2.3 | 1.1 | 2.3 | 3570 | 1010 | 880 | 300 | 216 | 23/72 | 0.65 |
| 20* | 1300 | 3100 | 2.1 | 0.0 | −10.1 | 0.5 | −16.6 | 16.6 | 6100 | 3310 | 1280 | 370 | 182 | 0/72 | 0.69 |
| 21* | 1300 | 3300 | 1.5 | 0.7 | −11.9 | 0.3 | −17.9 | 17.9 | 6150 | 2180 | 1860 | 610 | 303 | 0/72 | 0.73 |
| 22* | 1300 | 3520 | 2.4 | 2.3 | −12.9 | 3.1 | −19.2 | 19.2 | 6800 | 2770 | 2410 | 660 | 511 | 0/72 | 0.76 |
| 23* | 1300 | 3580 | 1.9 | −1.0 | −6.8 | −2.1 | −7.6 | 7.6 | 3580 | 1550 | 690 | 410 | 196 | 0/72 | 0.74 |
| 24* | 1280 | 3300 | 1.8 | −0.4 | −7.2 | −1.0 | −8.9 | 8.9 | 3960 | 1280 | 650 | 320 | 233 | 0/72 | 0.72 |
| 25* | 1300 | 3260 | 1.6 | −0.1 | −5.9 | −0.1 | −8.3 | 8.3 | 3220 | 1150 | 980 | 240 | 113 | 0/72 | 0.71 |
| 26* | 1360 | | | Impossible for measurement because of insufficient sintering | | | | | | | | | | | 0.62 |
| 27* | 1360 | 2550 | 1.6 | 2.8 | 2.5 | 3.7 | −3.4 | 3.1 | 6280 | 3080 | 2190 | 630 | 430 | 50/70 | 0.67 |
| 28* | 1220 | 2030 | 1.4 | 1.1 | −2.7 | 1.8 | 3.2 | 3.2 | 6410 | 2100 | 2060 | 510 | 203 | 0/72 | 0.68 |
| 29* | 1300 | 2520 | 1.7 | −1.8 | −4.5 | −3.0 | −5.8 | 5.8 | 6710 | 2720 | 2310 | 600 | 536 | 0/72 | 0.65 |

As is clear from Tables 1 to 3, it can be seen that in the monolithic ceramic capacitors of the present invention, the dielectric constant is as high as 3,000 or higher, the dielectric loss is 2.5% or lower, and the changing ratio of the electrostatic capacity to temperature satisfies the B characteristic standard prescribed by the JIS standard in the range of from −25° C. to 85° C. and satisfies the X7R characteristic standard prescribed by the EIA standard in the range of from −55° C. to 125° C.

Also, as shown in these tables, the monolithic ceramic capacitors of the present invention have advantages.

That is, when the insulating resistances at 25° C. and 125° C. in a high electric field strength of 20 kV/mm are shown by the CR products, these are high values of 2,000 MΩ.μF or higher and 500 MΩ.μF or higher, respectively.

The average life time is long as 500 hours or longer and also the occurrence of inferior results The calcining temperature is 1,300° C. or lower and sintering can be carried tance of a high voltage at 125° C. is lowered and the average life time is extremely shortened.

When the amount $(\alpha+\beta)$ of $(M_2O_3+Re_2O_3)$ exceeds about 0.025 as in Sample No. 19, the dielectric constant is lower than 3,000, the insulating resistances at 25° C. and 125° C. are lowered, the average life time is short, inferior results occur in the wet loading test and the sintering temperature becomes high.

When the amount γ of (Mn, Ni, Co)O is less than about 0.0025 as in Sample No. 2, the dielectric ceramic calcined in a reducing atmosphere is reduced to become a semiconductor-like material and the insulating resistance is lowered.

When the amount γ of (Mn, Ni, Co)o exceeds resistance at 125° C. is lowered regardless of the applied voltage, the average life time is shortened and the temperature changing ratio of the electrostatic capacity become large.

When the dielectric ceramic material does not contain any Mn as in Sample Nos. 23, 24 and 25, the insulating resistance is lowered and the average life time becomes shorter than 500 hours.

When the amount β of $Re_2O_3$ is 0 as in Sample No. 3, the average life time becomes shorter than 500 hours.

When the amount β of $Re_2O_3$ exceeds about 0.0075 as in Sample No. 22, the temperature changing ratio of the electrostatic capacity becomes large and does not satisfy the B characteristics of the JIS standard and the X7R characteristics of the EIA standard.

When the ratio γ/(α+β) of the amount γ of (Mn, Ni, Co)O to the amount (α+β) of $(M_2O_3+Re_2O_3)$O exceeds about 4 as in Sample No. 21, the temperature changing ratio of the electrostatic capacity becomes large, the insulating resistance at 125° C. is lowered and the average life time becomes shorter than 500 hours.

When the mol ratio m of barium titanate is about 1,000 or lower as in Sample Nos. 4 and 5, the dielectric ceramics become semiconductor-like materials when calcined in a reducing atmosphere or the insulating resistance is lowered and the average life time becomes shorter than 500 hours.

When the mol ratio m of barium titanate exceeds about 1.035 as in Sample No. 26, the sintering property is extremely reduced.

When the amount of MgO is less than about 0.5 mol as in Sample No. 6, the insulating resistance is lowered, the average life time becomes shorter than 500 hours and the temperature changing ratio of the electrostatic capacity cannot satisfy the B characteristics prescribed by the JIS standard and the X7R characteristics prescribed by the EIA standard.

When the amount of MgO exceeds about 5.0 mols as in Sample No. 27, the sintering temperature becomes high, the dielectric constant becomes lower than 3,000, the average life time is short and inferior results occur in the wet loading test.

When the amount of silicon oxide is less than about 0.2 mol as in Sample No. 7, sintering becomes insufficient.

When the amount of silicon oxide exceeds about 5.0 mols as in Sample No. 28, the dielectric constant does not exceed 3,000.

When the amount of alkali metal oxides contained in barium titanate as impurities exceeds about 0.02 part by weight as in Sample No. 29, the dielectric constant is lowered.

There is no particular regulation on the value of the ratio (β/α) of the amount β of $Re_2O_3$ to the amount α of $M_2O_3$ but to give room to the temperature changing ratio of the electrostatic capacity from the allowable value of the standard, it is preferred that β/α≦1.

In addition, in the above-described examples, a barium titanate powder prepared by an oxalic acid method was used but the barium titanate used in the present invention is not limited to such barium titanate powder and a barium titanate powder prepared by an alkoxide method or a hydrothermal synthesis method may be used in the present invention. possible that more improved characteristics than those of the examples described above are obtained.

Also, scandium oxide, yttrium oxide, samarium oxide, europium oxide, manganese oxide, cobalt oxide, nickel oxide and magnesium oxide powders were used in the above-described examples but these oxides are not limited to these powders, and when the oxides are compounded such that they constitute the dielectric ceramic layer of the component range defined in the present invention, by using a solution of the alkoxides, the organic metals, etc., the characteristics obtained are not spoiled.

Because the monolithic ceramic capacitor of the present invention is composed of the dielectric ceramic material which is not reduced even by calcining in a reducing atmosphere and does not become a semiconductor-like material, nickel or a nickel alloy can be used as the electrode material, the dielectric ceramic material can be calcined at a relatively low temperature as 1,300° C. or lower and the cost for the monolithic ceramic capacitor can be reduced.

Also, in the monolithic ceramic capacitor using the dielectric ceramic material, the dielectric constant is 3,000 or higher and the temperature change of the dielectric constant is small.

Furthermore, the monolithic ceramic capacitor of the present invention has a high insulating resistance and shows excellent characteristics without causing the deterioration of the characteristics under high temperature and high humidity. Accordingly, when the dielectric ceramic layers are thinned, it is unnecessary to lower the rated voltage.

Moreover, because the crystal grain sizes are as small as 1 μm or lower in the present invention, when the dielectric ceramic layers are thinned, the number of the crystal grains existing in each layer can be increased as compared with conventional monolithic ceramic capacitors, whereby a small-sized and large capacity monolithic ceramic capacitor having high reliability can be obtained.

While the invention has been described in detail and with reference to specific embodiments thereof, it will be apparent to one skilled in the art that various changes and modifications can be made therein without departing from the spirit and scope thereof.

What is claimed is:

1. A monolithic ceramic capacitor comprising:
   a pair of external electrodes;
   a plurality of dielectric layers disposed between said electrodes, each of said dielectric layer comprising:
     barium titanate containing alkali metal oxides impurities in an amount of not more than about 0.02% by weight,
     at least one oxide selected from the group consisting of scandium oxide and yttrium oxide,
     at least one oxide selected from the group consisting of samarium oxide and europium oxide, and
     at least one oxide selected from the group consisting of manganese oxide, cobalt oxide and nickel oxide,
     and further containing per 100 mols of a principal component, magnesium oxide in an amount of from about 0.5 to 5.0 mols and silicon oxide in an amount of from about 0.2 to 5.0 mols wherein the principal component is represented by the component formula:

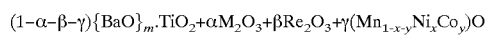

$(1-\alpha-\beta-\gamma)\{BaO\}_m \cdot TiO_2 + \alpha M_2O_3 + \beta Re_2O_3 + \gamma(Mn_{1-x-y}Ni_xCo_y)O$ wherein M is at least one of Sc and Y; Re is at least one of Sm and Eu; and α, β, γ, m, x, and y are
0.0025≦α+β≦0.025,
0<β≦0.0075,
0.0025≦γ≦0.05,
γ/(α+β)≦4,
0≦x<1.0,
0≦y<1.0,
0≦x+y≦1.0,
1.000<m≦1.035; and
at least two internal electrodes, each of which is disposed between adjacent dielectric layers.

2. The monolithic ceramic capacitor according to claim 1, wherein said internal electrodes comprise nickel or a nickel alloy.

3. The monolithic ceramic capacitor according to claim 2, wherein $0.006 \leq \alpha+\beta \leq 0.02$, $0.0005 \leq \beta \leq 0.005$, $0.009 \leq \gamma \leq 0.04$, $\gamma/(\alpha+\beta) \leq 2$, $0.1 \leq x \leq 0.3$, $0.1 \leq y \leq 0.4$, $0.2 \leq x+y \leq 0.4$, and $1.005 \leq m \leq 1.015$.

4. The monolithic ceramic capacitor according to claim 3, wherein M is Y.

5. The monolithic ceramic capacitor according to claim 4, wherein Re is Sm, the number of mols of MgO per 100 mols is about 0.8–3, and the number of mols of $SiO_2$ per 100 is about 1–2.5.

6. The monolithic ceramic capacitor of claim 5, wherein said external electrodes comprise a sintered layer of an electrically conductive metal powder.

7. The monolithic ceramic capacitor of claim 6, wherein said sintered layer contains a glass frit.

8. The monolithic ceramic capacitor of claim 5, wherein said external electrodes comprise a first layer of a sintered layer of an electrically conductive powder and a second plating layer on the first layer.

9. The monolithic ceramic capacitor of claim 8, wherein said sintered layer contains a glass frit.

10. The monolithic ceramic capacitor of claim 2, wherein said external electrodes comprise a sintered layer of an electrically conductive metal powder.

11. The monolithic ceramic capacitor of claim 10, wherein said sintered layer contains a glass frit.

12. The monolithic ceramic capacitor of claim 2, wherein said external electrodes comprise a first layer of a sintered layer of an electrically conductive powder and a second plating layer on the first layer.

13. The monolithic ceramic capacitor of claim 12, wherein said sintered layer contains a glass frit.

14. The monolithic ceramic capacitor according to claim 1, wherein $0.006 \leq \alpha+\beta \leq 0.02$, $0.0005 \leq \beta \leq 0.005$, $0.009 \leq \gamma \leq 0.04$, $\gamma/(\alpha+\beta) \leq 2$, $0.1 \leq x \leq 0.3$, $0.1 \leq y \leq 0.4$, $0.2 \leq x+y \leq 0.4$, and $1.005 \leq m \leq 1.015$.

15. The monolithic ceramic capacitor according to claim 14, wherein M is Y.

16. The monolithic ceramic capacitor according to claim 15, wherein Re is Sm, the number of mols of MgO per 100 mols is about 0.8–3, and the number of mols of $SiO_2$ per 100 is about 1–2.5.

17. The monolithic ceramic capacitor of claim 1, wherein said external electrodes comprise a sintered layer of an electrically conductive metal powder.

18. The monolithic ceramic capacitor of claim 17, wherein said sintered layer contains a glass frit.

19. The monolithic ceramic capacitor of claim 1, wherein said external electrodes comprise a first layer of a sintered layer of an electrically conductive powder and a second plating layer on the first layer.

20. The monolithic ceramic capacitor of claim 19, wherein said sintered layer contains a glass frit.

21. A dielectric ceramic comprising:

barium titanate containing alkali metal oxide impurities in an amount of not more than about 0.02% by weight, at least one oxide selected from the group consisting of scandium oxide, and yttrium oxide, at least one oxide selected from the group consisting of samarium oxide and europium oxide, and at least one oxide selected from the group consisting of manganese oxide, cobalt oxide and nickel oxide, and further containing per 100 mols of a principal component, magnesium oxide in an amount of from about 0.5 to 5.0 mols and silicon oxide in an amount of from about 0.2 to 5.0 mols wherein the principal component is represented by the following component formula:

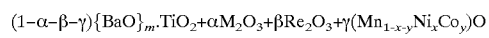

$(1-\alpha-\beta-\gamma)\{BaO\}_m \cdot TiO_2 + \alpha M_2O_3 + \beta Re_2O_3 + \gamma(Mn_{1-x-y}Ni_xCo_y)O$ wherein M is at least one of Sc and Y; Re is at least one of Sm and Eu; and $\alpha$, $\beta$, $\gamma$, m, x, and y are $0.0025 \leq \alpha+\beta \leq 0.025$,
$0 < \beta \leq 0.0075$,
$0.0025 \leq \gamma \leq 0.05$,
$\gamma/(\alpha+\beta) \leq 4$,
$0 \leq x < 1.0$,
$0 \leq y < 1.0$,
$0 \leq x \leq 1.0$, and
$1.000 < m \leq 1.035$.

22. The dielectric ceramic according to claim 21, wherein $0.006 \leq \alpha+\beta \leq 0.02$, $0.0005 \leq \beta \leq 0.005$, $0.009 \leq \gamma \leq 0.04$, $\gamma/(\alpha+\beta) \leq 2$, $0.1 \leq x \leq 0.3$, $0.1 \leq y \leq 0.4$, $0.2 \leq x+y \leq 0.4$, and $1.005 \leq m \leq 1.015$.

23. The dielectric ceramic according to claim 22, wherein M is Y.

24. The dielectric ceramic according to claim 23, wherein Re is Sm, the number of mols of MgO per 100 mols is about 0.8–3, and the number of mols of $SiO_2$ per 100 is about 1–2.5.

25. The dielectric ceramic according to claim 21, wherein M is Y.

* * * * *